(12) United States Patent
Colombo

(10) Patent No.: US 6,877,601 B1
(45) Date of Patent: Apr. 12, 2005

(54) PACKAGING SYSTEM FOR EXTENDING THE SHELF LIFE OF MOISTURE-CONTAINING FOODS

(75) Inventor: Edward A. Colombo, Penfield, NY (US)

(73) Assignee: Tres Fresh L.L.C., Penfield, NY (US)

( * ) Notice: Subject to any disclaimer, the term of this patent is extended or adjusted under 35 U.S.C. 154(b) by 290 days.

(21) Appl. No.: 10/280,034

(22) Filed: Oct. 24, 2002

Related U.S. Application Data

(63) Continuation-in-part of application No. 09/906,280, filed on Jul. 16, 2001, now Pat. No. 6,520,323, and a continuation-in-part of application No. 09/196,450, filed on Nov. 19, 1998, now Pat. No. 6,210,725, and a continuation-in-part of application No. 09/182,754, filed on Oct. 29, 1998, now Pat. No. 6,023,915, said application No. 09/906,280 is a continuation-in-part of application No. 09/684,381, filed on Oct. 7, 2000, now Pat. No. 6,269,946, which is a continuation-in-part of application No. 09/609,798, filed on Jul. 3, 2000, now Pat. No. 6,269,945, which is a continuation-in-part of application No. 09/519,105, filed on Mar. 6, 2000, now Pat. No. 6,213,294, which is a continuation-in-part of application No. 09/342,844, filed on Jun. 29, 1999, now Pat. No. 6,112,890.

(51) Int. Cl.[7] .............................................. B65D 81/20
(52) U.S. Cl. ....................... 206/213.1; 53/434; 426/129
(58) Field of Search .......... 53/403, 432, 434; 206/204, 206/205, 213.1, 219, 524.8; 383/103; 426/129

(56) References Cited

U.S. PATENT DOCUMENTS

| | | | | |
|---|---|---|---|---|
| 3,521,806 A | * | 7/1970 | Esty | 229/117.3 |
| 3,574,642 A | * | 4/1971 | Weinke | 426/124 |
| 3,681,092 A | * | 8/1972 | Titchenal et al. | 426/412 |
| 4,247,517 A | * | 1/1981 | Sanderson et al. | 422/26 |
| 4,372,921 A | * | 2/1983 | Sanderson et al. | 422/300 |
| 4,548,824 A | * | 10/1985 | Mitchell et al. | 426/111 |
| 5,332,121 A | * | 7/1994 | Schmidt et al. | 222/95 |
| 5,561,915 A | * | 10/1996 | Vandergriff | 34/201 |
| 5,628,404 A | * | 5/1997 | Hendrix | 206/524.8 |
| 5,667,827 A | * | 9/1997 | Breen et al. | 426/129 |
| 5,698,250 A | | 12/1997 | DelDuca et al. | |
| 5,705,210 A | * | 1/1998 | Sillince et al. | 426/112 |
| 5,711,978 A | * | 1/1998 | Breen et al. | 426/129 |
| 5,731,023 A | * | 3/1998 | Milani | 426/410 |
| 5,811,142 A | | 9/1998 | DelDuca | |
| 5,916,613 A | * | 6/1999 | Stockley, III | 426/124 |
| 5,948,457 A | | 9/1999 | DelDuca | |
| 5,950,402 A | * | 9/1999 | Hoddinott | 53/432 |
| 6,054,153 A | * | 4/2000 | Carr et al. | 426/87 |
| 6,112,890 A | | 9/2000 | Colombo | |
| 6,279,581 B1 | * | 8/2001 | Knepper | 131/329 |

\* cited by examiner

*Primary Examiner*—Jim Foster
(74) *Attorney, Agent, or Firm*—Howard J. Greenwald P.C.

(57) ABSTRACT

A packaging system for preserving perishable moisture-containing items comprising a shrinkable barrier bag comprising at least one compartment, and a one-way valve disposed in the wall of the barrier bag, sealing means for closing the barrier bag, a carbon dioxide gas source gas disposed within the barrier bag, a clear transparent oxygen-permeable container disposed within the barrier bag, for containment of perishable moisture containing items, and a water-containing pad disposed within the barrier bag for providing humidity within the barrier bag.

27 Claims, 15 Drawing Sheets

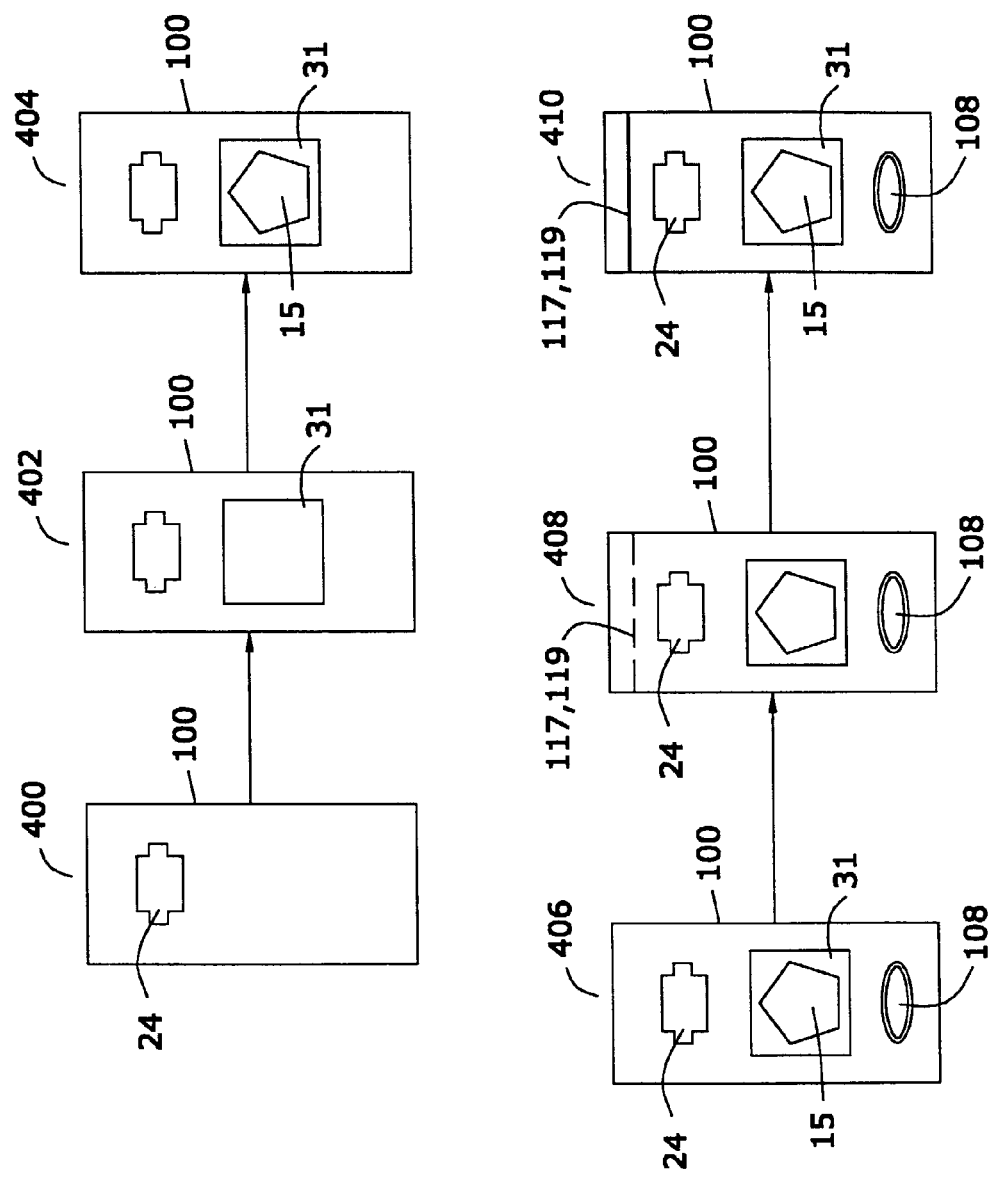

PACKAGING SYSTEM FOR EXTENDING THE SHELF LIFE OF MOISTURE-CONTAINING FOODS

CROSS-REFERENCE TO RELATED PATENT APPLICATIONS

This application is a continuation-in-part of applicant's patent application U.S. Ser. No. 09/906,280, filed on Jul. 16, 2001, U.S. Pat. No. 6,520,323 which was a continuation-in-part of U.S. Ser. No. 09/684,381, filed on Oct. 7, 2000 (now U.S. Pat. No. 6,269,946), which was a continuation-in-part of U.S. Ser. No. 09/609,798, filed on Jul. 3, 2000 (now U.S. Pat. No. 6,269,945), which was a continuation-in-part of U.S. Ser. No. 09/519,105, filed on Mar. 6, 2000 (now U.S. Pat. No. 6,213,294), which was a continuation-in-part of U.S. Ser. No. 09/342,844, filed on Jun. 29, 1999 (now U.S. Pat. No. 6,112,890). This case is also a continuation-in-part of patent applications U.S. Ser. No. 09/196,450 (filed Nov. 19, 1998, now U.S. Pat. No. 6,210,725) and U.S. Ser. No. 09/182,754 (filed Oct. 29, 1998, now U.S. Pat. No. 6,023,915).

FIELD OF THE INVENTION

This invention relates to packaging systems for preserving perishable items which require the maintenance of a moist, but non-oxidizing environment within the packaging, and more particularly to packaging of moisture-containing baked products that are sensitive to oxygen and humidity, such as cakes, breads, and the like.

BACKGROUND OF THE INVENTION

Applicant's U.S. Pat. No. 6,112,890 describes a packaging system for preserving perishable items; the system of this patent was comprised of a barrier bag. This patent, and prior art cited in it, are the most relevant references known to applicant regarding the technology claimed in this patent application.

In the packaging of perishable foods, a non-oxidizing environment is needed to prevent the spoiling of the food by oxidation of various food constituents. In the applicant's copending patent application U.S. Ser. No. 09/906,280, filed on Jul. 16, 2001, there is disclosed a process for the packaging of perishable foods in a non-oxidizing environment, in which the perishable food is sealed in a package with a small piece of dry ice (solid carbon dioxide). After the package is sealed, the dry ice sublimes, and purges the ambient air containing approximately 20 percent oxygen through a one-way valve in the wall of the packaging. Accordingly, the atmosphere within the packaging is substantially devoid of oxygen, and the perishable food, typically meat, is protected from oxygen-caused degradation. Such packaging renders the product with a prolonged shelf life for retail sale.

However, the atmosphere within the packaging is substantially free of water vapor as well as oxygen when the sublimation of the dry ice is complete. While this is less of a problem for the packaging of meats, it is clearly unsatisfactory for the packaging of other perishable moisture-containing foods, such as breads, cakes, and other baked goods. The very low humidity inside of the packaging results in excessive drying of the baked goods, which renders them unpleasant to consume, and therefore unable to be sold. There is a need in the packaging of perishable moisture-containing foods, for the packaging to contain the food in an environment that is simultaneously non-oxidizing, and of high humidity.

It is therefore an object of this invention to provide a moisture-containing package for preserving perishable moisture-containing foods.

It is a further object of this invention to provide a self-humidifying package for preserving perishable moisture-containing foods.

It is an additional object of this invention to provide a method for the packaging of moisture-containing foods which provides such foods with a long shelf life.

SUMMARY OF THE INVENTION

In accordance with this invention, there is provided a packaging system for preserving perishable moisture-containing items comprising a barrier bag having at least one compartment, sealing means for closing said barrier bag, a non-oxidizing gas disposed within said barrier bag, a water-containing pad disposed within said barrier bag, and means for venting gases and water vapor from said barrier bag.

In accordance with this invention, there is further provided a packaging system for preserving perishable moisture-containing items comprising a shrinkable barrier bag comprising at least one compartment, and a one-way valve disposed in the wall of the barrier bag; sealing means for closing the barrier bag; a carbon dioxide gas source gas disposed within the barrier bag; a clear transparent oxygen-permeable container disposed within the barrier bag, for containment of perishable moisture containing items; and a water-containing pad disposed within the barrier bag for providing humidity within the barrier bag.

BRIEF DESCRIPTION OF THE DRAWINGS

The present invention will be more fully understood by reference to the following detailed description thereof, when read in conjunction with the attached drawings, wherein like reference numerals refer to like elements, and wherein:

FIGS. 9A and 9B are schematic representations of one preferred process of the invention utilizing the barrier bag depicted in FIG. 4;

DETAILED DESCRIPTION OF THE INVENTION

One Preferred Packaging System of the Invention

Figure 1:
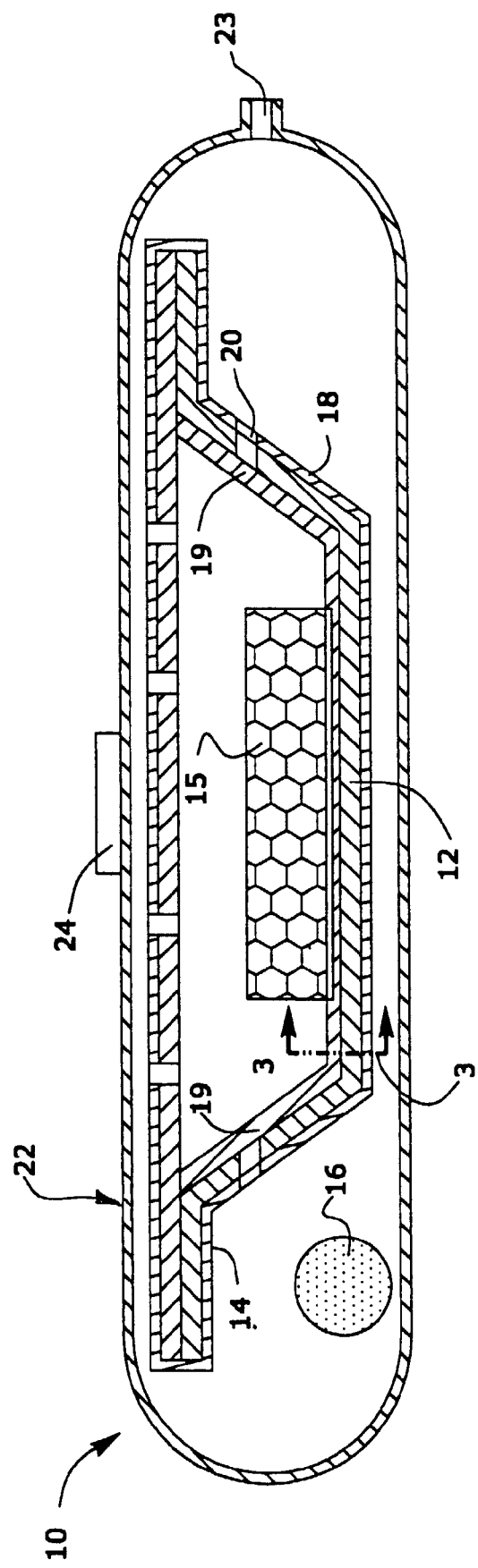
FIG. 1 is a sectional view of one preferred packaging system of the invention.

FIG. 1 is a sectional view of one preferred packaging system 10 which is comprised of a tray 12 which, in the preferred embodiment depicted, includes flanges 14 around the perimeter of such tray 12. A perishable good or goods 15 is disposed within tray 12.

The perishable goods which may advantageously be protected by the packaging system 10 of this invention include oxygen-sensitive food such as, e.g., red meat (veal, beef, pork, etc.), pasta, cooked food, and the like. Alternatively, one may preserve perishable non-food items such as photographic film, computer components, inorganic materials susceptible to oxidation, etc.

In one preferred embodiment, the goods disposed within the packaging system include red meat which has been processed to remove oxygen from its surfaces and prevent the formation of metmyoglobin. In this embodiment, the red meat disposed within the packaging system contains less than about 10 weight percent, by weight of total pigment in the red meat, of metmyoglobin.

In the preferred embodiment depicted in FIG. 1, a skin layer 19 is contiguous with and attached to the bottom surface of the tray and preferably up the side of the tray to the flanges 14.

In the preferred embodiment depicted in FIG. 1, a gas permeable film material 18, which may include slits or perforations 20, covers the perishable goods 15. This skin layer 19 is illustrated more clearly in FIG. 3.

Referring again to FIG. 1, it will be seen that the tray 12 which is overwrapped with gas permeable film material 18 is disposed within a barrier bag 22 which surrounds the tray 12 and which preferably is made of a substantially impermeable material. This barrier bag is attached to a one-way valve 24, which will be described in greater detail elsewhere in this specification.

From about 10 to about 150 grams of solid carbon dioxide 16, which may be in the form a flakes, one or more pellets, an irregular shape, etc., are disposed outside of tray 12 but within barrier bag 22.

The barrier bag 22, prior to the time it is sealed, contains an opening 23 at one end, sufficient in size for the insertion of tray 12 into bag 22.

Figure 2A:
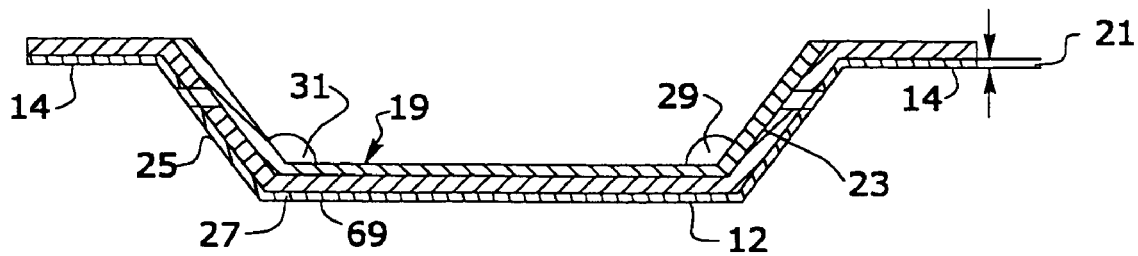
FIGS. 2A, 2B, 2C, 2D, and 2E schematically illustrate one means of preparing and using the packaging system of FIG. 1.

FIG. 2A is a sectional view of tray 12 attached to skin layer 19. The tray 12 is comprised of at least 90 weight percent of foam material. In one preferred embodiment, the foam material is open-cell foam which contains at least about 20 volume percent of open cells.

As is known to those skilled in the art, an open-cell cellular plastic is a cellular plastic in which there is a substantial number of interconnected cells; see, e.g., A.S.T.M. D883. Reference also made by had to U.S. Pat. No. 5,798,409 (open cell foams of polystyrene and polyurethane), U.S. Pat. No. 5,784,845 (open cell foam material made from alkenyl aromatic polymer material), U.S. Pat. No. 5,646,193 (rigid open cell foam material), U.S. Pat. Nos. 5,557,816, 5,475,890, 5,434,024 (open cell foam material of polyvinyl chloride, or polyisocyanate, or polyphenol, or polypropylene), U.S. Pat. Nos. 5,348,587, 5,343,109, 5,239,723, 5,139,477 (polyethylene open cell foam material), U.S. Pat. Nos. 4,739,522, 4,395,342 (open cell foam material made from cellulose acetate, or phenol-formaldehyde, or cellular rubber), etc. The disclosure of each of these United States patents is hereby incorporated by reference into this specification.

It is preferred that the open cell foam material be made from a resin selected from the group consisting of polyethylene, polyvinyl chloride, polyacrylonitrile (such as the "BAREX" resin sold by the British Petrolem/Amoco company), poly(ethylene terephthalate), polystyrene, rubber-modified polystyrene, ethylenepolystyrene, interpolymers (such as "INDEX" interpolymers sold by Dow Chemical Corporation of Midland Michigan), polypropylene, polyurethane, polyisocyanurate, epoxy, urea formadehyde, rubber latex, silicone, fluropolymer or copolymers thereof or blends thereof, and in general any other suitable resin, resin mixture, or any foamable composition which can be made with an open cell structure such as, e.g., materials made using a silane peroxide catalyst system (sold by the Sentinel Foam company or Hyanis, Mass.).

As is well known to those skilled in the art, one may vary the degree to which a foam material contains open-cell structure by the process taught by applicant in his 1977 article entitled "Controlling the Properties of Extruded Polystyrene Foam." This article was presented at the Proceedings of the International Conference on Polymer Processing, which was held at the Massachusetts Institute of Technology, Cambridge, Mass, in August 1977. These proceedings were published in 1977 in a book edited by Nam P. Suh and Nak-Ho Sung entitled "Science and Technology of Polymer Processing" (The MIT Press, Cambridge, Mass., 1977); and a description of means to control the concentration of open cells appeared on page 410 of this book. In particular, the correlation between the concentration of open cells produced in the foam and the melt temperature of the resin/blowing agent mixture used, was discussed.

Referring again to FIG. 2A, and in the preferred embodiment depicted therein, the tray 12 is comprised of foam material which contains at least about 20 volume percent of open cells. In one preferred embodiment, the foam material contains at least about 30 volume percent of open cells. It is even more preferred that the foam material contain from about 30 to about 90 volume percent of open cells and, even more preferably, from about 45 to about 90 volume percent of open cells. The extent to which a foam material contains open-cell foam may be determined by A.S.T.M. Standard Test D2856-94, "Test Method for Open-Cell Content of Rigid Cellular Plastics by the Air Pycnometer."

The open-cells in the foam contain a gas phase with gases that are substantially identical to the gases in ambient air. Thus, the open-cells generally contain a gas phase comprised of from about 19 to about 22 volume percent of oxygen (depending upon the altitude) and from about 78 to about 81 volume percent of nitrogen. In general, such gas phase contains from about 20.5 to about 21 volume percent of oxygen and from about 79 to about 79.5 volume percent of nitrogen. However, after the open-cells in the gas tray have been treated by the process of this invention, they preferably contain less than about 0.05 volume percent of oxygen.

FIGS. 2B, 2C, 2D, and 2E illustrate how use the tray depicted in FIG. 2A can be used to make the structure depicted in FIG. 1. For the sake of simplicity of representation, much of the detailed description of the tray contained in FIG. 2A has been omitted from FIGS. 2B, 2C, 2D, and 2E.

Figure 2B:
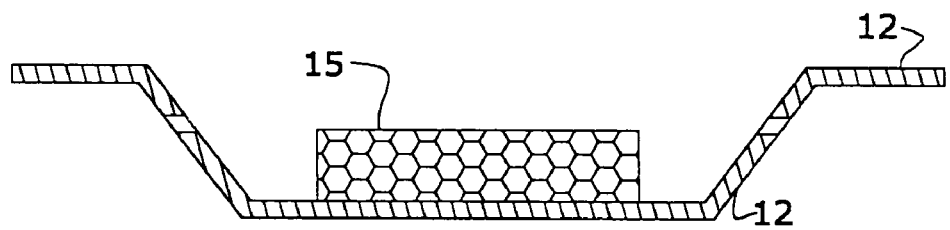
Figure 2C:
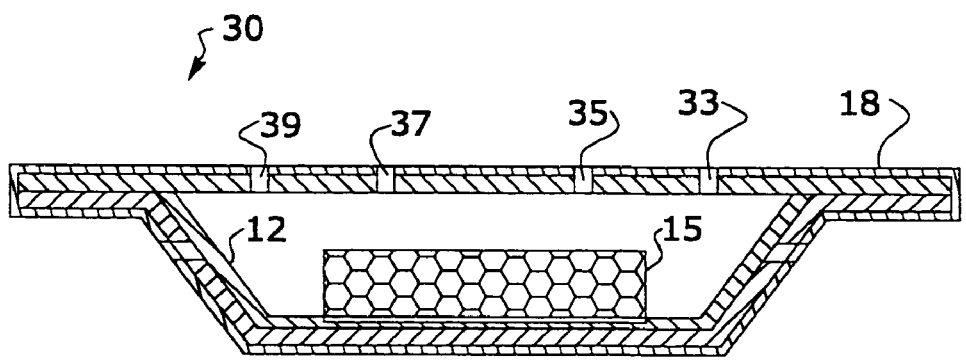

After the tray 12 has been fabricated (see FIG. 2A), the good or goods 15 are placed in the tray and then wrapped either manually or automatically with a gas permeable film material 18, or other suitable means, to holds the goods 15 in place, thereby forming wrapped tray 30 (see FIG. 2C).

The open-cell foam material which comprises tray 12 have as an average cell diameter of from about 0.0001 to about 0.030 inches and, more preferably, from about 0.002 to about 0.008 inches. In one preferred embodiment, the cell diameter of such cells is from about 0.003 to about 0.007 inches.

The average cell diameter of a foam may be determined in accordance with the procedure described in applicant's U.S. Pat. Nos. 3,953,739 and 4,329,052, the disclosures of which are hereby incorporated by reference into this specification. One may also use one or more of the methods disclosed in other United States patents, such as, e.g., U.S. Pat. Nos. 5,912,729, 5,817,704, 5,810,964, 5,798,065, 5,795,680, 5,790,926, 5,786,401, 5,770,634, 5,7532,717, 5,912,729, and the like. The disclosure of each of these United States patents is hereby incorporated by reference into this specification.

Referring again to FIG. 1A, the tray 12 has walls with a thickness 21 of from about 0.025 to about 0.5 inches and, preferably, from about 0.040 to about 0.15 inches. In one embodiment, the thickness 21 is from about 0.04 to about 0.1 inches. The thickness of the sidewalls 23 and 25 of tray 12 may be equal to or less than the thickness of the bottom surface 27 of tray 12. In one embodiment, the thickness of sidewall 25 is from 25 to about 50 percent of the thickness of the bottom surface 27.

In one preferred embodiment, illustrated in FIG. 2A, the bottom surface 27 of tray 12 forms an interior angle (29 or 31) between sidewalls 23 or 25 of from about 1 to about 90 degrees and, preferably, from about 25 to about 50 degrees. Angles 29 and 31 may be the same or different.

Referring again to FIG. 2A, the tray 12 preferably has a density of from about 0.1 to about 55 pounds per cubic foot and, preferably from about 1 to about 10 pounds per cubic foot, and more preferably from about 1.5 to about 6 pounds per cubic foot. It is even more preferred that the density be from about 2.0 to about 5.0 pounds per cubic foot. In one embodiment, the density of tray 12 is from about 2 to about 3 pounds per cubic foot.

Referring again to FIG. 2A, it will be seen that tray 12 is attached to a skin 19. The thickness of skin 19 is preferably from about 0.0005 to about 0.01 inches and, more preferably, from about 0.002 to about 0.005 inches.

In FIGS. 2B through 2E, tray 12 is depicted in various combination with other elements. However, for the sake of simplicity of representation, many of the details of tray 12 depicted in FIG. 2A have been omitted in these latter Figures.

As is illustrated in FIG. 2B, the perishable goods 15 are placed within tray 12, either manually or automatically. In one embodiment, not illustrated, an absorbent pad is placed between the goods 15 and the bottom of the tray in order to absorb excess juices exuded from the goods 15.

Referring to FIG. 2C, a gas permeable film material 18 adapted to pass both oxygen and carbon dioxide is wrapped around the entire tray 12. The film material may be adhered to the tray because of its "cling properties," and/or it may be heat-treated to cause it to adhere to the tray; in each either event, the film 18 is contiguous with the sides and the bottom of tray 12 and encloses the perishable goods 15. Thus, as is disclosed in U.S. Pat. No. 5,698,250, the film 18 may contain additives which allow the film to cling to itself. This film generally has a thickness ranging from about 0.5 mil to about 1.5 mils.

These gas-permeable films are well known to those skilled in the art and are described, e.g., in U.S. Pat. Nos. 5,888,597, 5,885,699, 5,852,152 (ethylene/vinyl acetate film and ethylene/acrylic acid film), U.S. Pat. Nos. 5,840,807, 5,839,593, 5,804,401, 5,780,085, 5,759,712, 4,056,639, 4,011,348, 3,867,558, 3,857,981, 3,728,135, and the like. The disclosure of each of these United States patents is hereby incorporated by reference into this specification.

In one preferred embodiment, film 18 is a polyvinyl chloride film supplied by the Borden Packaging and Industrial Products Company of North Andover, Mass. as "Resinite." This film 18 has an oxygen permeability of from about 1100 to about 1400 cubic centimeters per 100 square inches per 24 hours, as measured by the Mocon Controls Oxtran 100 machine measured at 23 degrees Centigrade. The film has a carbon dioxide permeability of from about 12,400 to about 13,4000 cubic centimeters per 100 square inches per 24 hours as measured by a Linde Cell at 23 degrees Centigrade and 1 atmosphere pressure.

In the preferred embodiment depicted in FIG. 2C, film 18 is comprised of perforations 33, 35, 37, and 39. In this embodiment, it is preferred that each of such perforations have a maximum cross-sectional dimensional of less than about 0.05 inches. When such perforations are present, it is preferred that from about 1 to about 4 of them occur per square inch of surface.

Figure 2D:
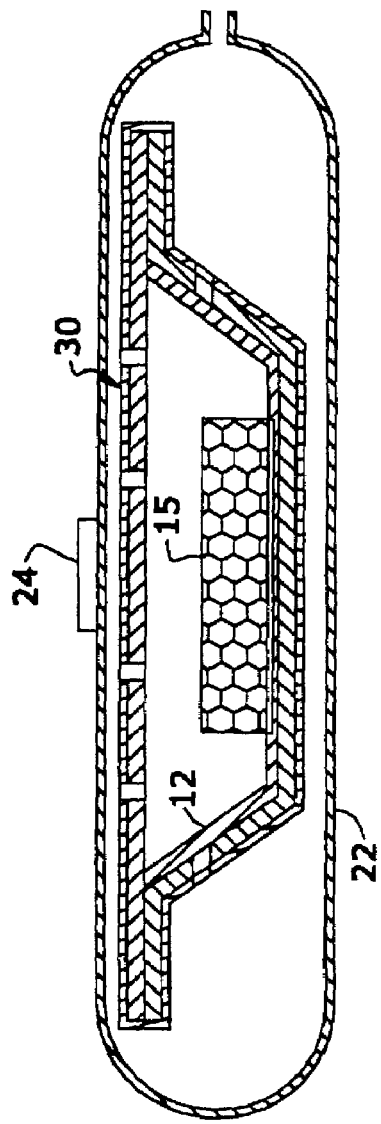

Referring to FIG. 2D, the wrapped tray 30 (see FIG. 2C) is wrapped in an oxygen barrier bag 22, which, in the preferred embodiment depicted, is preferably shaped similarly to a typical bag with an open end into which to insert the wrapped tray. Such oxygen barrier bags are well known to those skilled in the art and are described, e.g., in U.S. Pat. Nos. 5,862,947, 5,855,626, 5,811,027,5,799,463, 5,798,055, 5,780,085, 5,753,182, 5,711,978, 5,700,554, 5,667,827, 5,583,047, 5,573,801, 5,573,797, 5,529,833, 5,350,622, 5,346,644, 5,227,255, 5,203,138, 5,195,305, 4,857,326, 4,605,175, 4,082,829, 3,953,557, and the like. The disclosure of each of these United States patents is hereby incorporated by reference into this specification.

In one preferred embodiment, the barrier bag described in column 4 of U.S. Pat. No. 5,698,250 may be used. This bag is commercially available as product number 325C44-EX861B from the PrintPak, Inc. Company of Atlanta, Ga.

In another preferred embodiment, the barrier bag used is a biaxially oriented nylon film coated with an oxygen barrier coating (such as polyvinylidene chloride) and having a thickness of from about 0.00072 to about 0.00112 inches. Such a bag is commercially available from the Allied Signal Corporation (of New Jersey) as "Capron Emblem 1530" or "Capron Emblem 2530."

In one embodiment, the barrier bag is a shrinkable barrier bag which, after it is disposed over the tray, is caused to shrink by the application of heat. These heat shrinkable barrier bags are well known to those skilled in the art. Reference may be had, e.g., to U.S. Pat. Nos. 6,206,569, 6,045,924, 6,015,235, and the like. The disclosure of each of these United States patents is hereby incorporated by reference into this specification.

By way of further illustration, one may use the heat shrunk barrier bag disclosed in U.S. Pat. No. 5,916,613, the entire disclosure of which is hereby incorporated by reference into this specification. Thus, e.g., one may use a barrier bag known as the "B540 (TM) barrier bag, available from W.

R. Grace & Co- Conn., of Duncan, S.C. 29334. This barrier bag may be made of heat-shrinkable polyolefins and polyvinylidene chloride, and included a layer of cornstarch (known as C-3-170 Non-Offset Spray Powder (TM) cornstarch, and which, according to the manufacturer, is 99.0% foodstarch, 1% additive, this product being obtained from Varn, of Ridgewood, N.J.), in an amount of about 10 grams per 100 square inches, on the inside surface of the oxygen-impermeable film. The barrier bag was heat-shrunk so that the resulting package was substantially as illustrated in FIG. 1.

In another embodiment, one may use a heat shrinkable barrier bag obtained from the Cryovac Sealed Air Corporation of Duncan, South Carolina as product number LS 155 340CF.

Regardless of the particular barrier bag used, it is preferred that it have an oxygen permeability of less than 5 cubic centimeters per 100 square inches per 24 hours, as measured by a suitable gas permeability measuring device, such as the aforementioned Mocon Controls Oxtran 100 machine; measurements are taken under ambient conditions. This test method is well known, being described in A.S.T.M. Standard Test D-1434 "Test Method for Determining Gas Permeability Characteristics of Plastic Film and Sheeting." Reference may also be had to U.S. Pat. Nos. 5,913,445, 5,882,518, 5,769,262, 5,684,768, and the like. The disclosure of each of these United States patents is hereby incorporated by reference into this specification.

Referring again to FIG. 2D, the barrier bag 22 is preferably operably connected to a pressure relief valve 24. The pressure relief valve 24 is adapted to open and allow gas disposed within barrier bag 22 when the pressure within barrier bag 22 is from about 0.05 to about 1.0 pounds per square inch gauge and, more preferably, from about 0.1 to about 0.2 pounds per square inch gauge. In an even more preferred embodiment, the valve 24 is adapted to allow gas disposed within barrier bag 22 to vent to the outside when the pressure within such bag is from about 0.12 to about 0.14 pounds per square inch gauge.

The valve 24, after it is has opened to vent gas from the barrier bag 22, closes when the internal pressure drops within the range of from about 0.01 to about 0.04 pounds per square inch gauge.

Pressure sensitive gas valves for releasing gas from a sealed flexible pouch, such as valve 24, are well known to those skilled in the art. See, for example U.S. Pat. Nos. 5,059,036, 5,419,638, 5,048,846, 4,653,661, 4,690,667, and the like. The disclosure of each of these United States patents is hereby incorporated by reference into this specification.

In one preferred embodiment, the pressure sensitive gas valve is sold by the Plitek, Inc. company of 681 Chase Avenue, Elk Grove Village, Illinois 60007; see, e.g., a publication by Plitek (entitled "Plitek Pressure Relief Valve") which was published on Jul. 8, 1991. A copy of this publication is in the file history of U.S. Pat. No. 5,419,638 of Mark D. Jamison.

The valve 24 may be incorporated into the gas barrier bag 24 by conventional means such as, e.g., by means of the "CCL Model 230 Valve Applicator labeling system" which is sold by CCL Industries of 3070 Mainway, Units 16–19, Burlington, Ontario L7M3x1. This system is adapted to be secured to the side of a vertical form-fill and seal machine to apply self-adhesive valve labels to the plastic web on the forming tube section of the machine just prior to the seal and cut station.

Referring again to FIGS. 2D and 2E, after the sealed tray 30 is disposed within the barrier bag 22, solid carbon dioxide 16 is charged into the barrier bag 22 prior to the time the bag is sealed. In general, from about 10 to about 150 grams of solid carbon dioxide is charged to barrier bag 22. For a description of one use of such solid carbon dioxide in a barrier bag without a valve 24, reference may be had to U.S. Pat. Nos. 5,731,023 and 5,737,905. The entire disclosure of each of these United States patents is hereby incorporated by reference into this specification. It should be noted that the amount of solid carbon dioxide used in the processes of these patents is substantially less than the amount of carbon dioxide generally used in applicant's process. In general, a sufficient amount of carbon dioxide is used to generate at least about 1.5 liters of gaseous carbon dioxide per kilogram of perishable goods 15; see, e.g., an article by N. Penney and R. G. Bell entitled "Effect of Residual Oxygen on the Colour, Odour and Taste of Carbon-Dioxide-Packaged Beef, Lamb and Pork . . . " published in Meat Science 33 (1993) at pages 245–252.

Figure 2E:
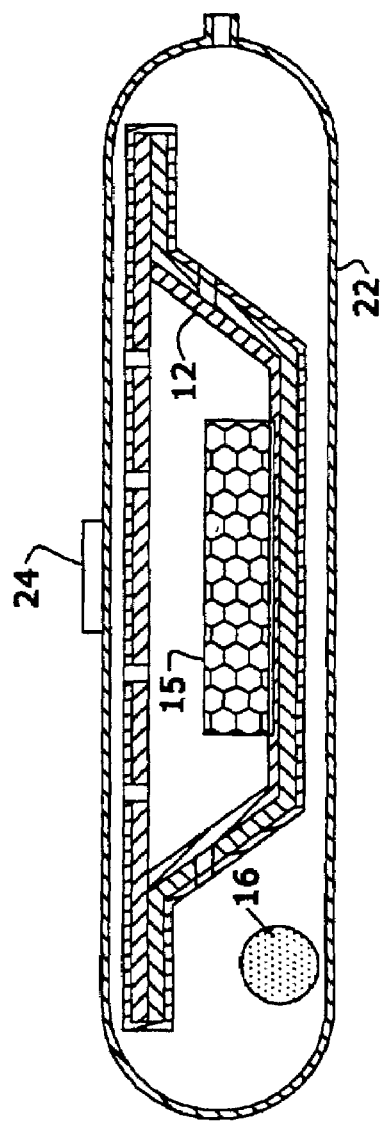

Referring to FIG. 2E, after the solid carbon dioxide is disposed within barrier bag 22, the bag is heat sealed by conventional means; see, e.g., U.S. Pat. Nos. 5,908,676, 5,799,463, 5,759,653, 5,332,121, and the like. The disclosure of each of these United States patents is hereby incorporated by reference into this specification.

In one embodiment, after the barrier bag 22 has been heat sealed, a vacuum is applied through valve 24 to remove air disposed within barrier bag 22.

Figure 3:
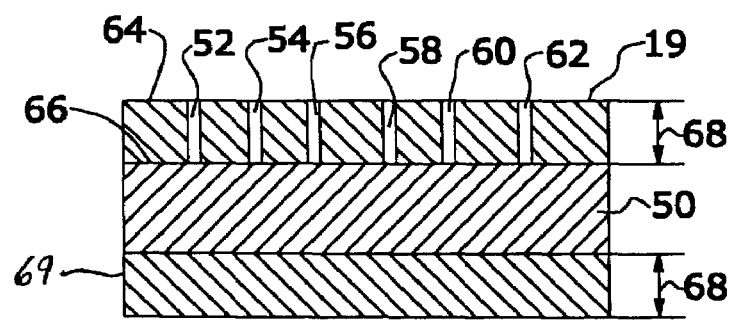
FIG. 3 is a sectional view of a portion of the tray used in the system of FIG. 1.

FIG. 3 is a sectional view, taken through line 3—3 of FIG. 1, of tray 12. Referring to FIG. 3, and to the preferred embodiment depicted therein, it will be seen that tray 12 is comprised of open cell foam 50 to which is attached a skin layer 19 which is preferably comprised of a multiplicity of through-holes 52, 54, 56, 58, 60, and 62. These through holes have a maximum dimension (such as a maximum diameter) of from about 5 to about 40 mils and generally extend from the top surface 64 of the skin layer 19 to the top surface 66 of the open cell foam layer.

In another embodiment, not shown, no such through holes exist in the skin layer 19. In either embodiment, however, the skin layer has a thickness 68 of from about 0.0005 to about 0.01 inches, and, preferably, from about 0.002 to about 0.005 inches.

As will be apparent to those skilled in the art, the structure depicted in FIG. 3 is a laminated structure with one or more skin layers 19 and/or 68. Means for producing such a laminated structure are well known. Thus, by way of illustration, in the process of Example 4 of U.S. Pat. No. 4,510,031, a 0.2 millimeter thick sheet of an ethylene/propylene block copolymer having a density of 0.91 was heat laminated to both surfaces of a foamed sheet. Thus, by way of further illustration, laminates made by bonding a skin layer to a foam core are described in U.S. Pat. Nos. 5,882,776, 5,876,813, 3,633,459, and the like. Thus, by way of even further illustration, U.S. Pat. No. 4,098,941 discloses a process in which a skin layer is formed in situ on a foam core by heat treatment. The disclosure of each of these United States patents is hereby incorporated by reference into this specification.

The skin layers 19 and/or 68 may be adhered to the foam layer 50 by adhesive means, by heat lamination means, by coextrusion, by mechanical means, and by other conventional means known to those skilled in the art. The skin layer 19 and/or the skin layer 68 may consist essentially of unfoamed plastic (such as polystyrene, or rubber-modified polystyrene, or polyethylene or polypropylene, mixtures thereof, and the like), paper, and the like. In another embodiment, the skin layer 19 and/or the skin layer 68 may consist essentially of either open cell foam and/or closed cell foam.

Without wishing to be bound by any particular theory, applicant believes that the laminated structure possesses substantially more flexural strength than the unlaminated foam core and, in many cases, reaches or exceeds the structural strength of an unlaminated closed cell foam core, such as the ones described in U.S. Pat. No. 5,698,250.

Processes for making closed cell polystyrene foam are well known to those skilled in the art. See, e.g., the following United States patents, each of which named the applicant as an inventor: U.S. Pat. Nos. 5,356,944, 5,286,429, 4,747,983, 4,329,052, 4,022,858, 3,953,739, 3,879,507, and the like. The disclosure of each of these United States patents is hereby incorporated by reference into this specification.

Processes for modifying closed-cell polystyrene foam processes to make open cell foam are also well known to those skilled in the art. See, e.g., the article by applicant entitled "Controlling the Properties of Extruded Polystyrene Foam" given at the Proceedings of the International Conference on Polymer Processing held at The Massachusetts Institute of Technology, Cambridge, Mass. in August of 1977 which was published in a book entitled "Science and Technology of Polymer Processing," edited by Nam P. Suh and Nak-Ho Sung (The MIT Press, Cambridge, Mass., 1977). Reference may also be had to U.S. Pat. Nos. 5,798,409, 5,784,845, 5,646,193, 5,557,896, 5,475,890, 5,434,024, 5,343,109, 5,239,723, 5,139,477, 4,739,522, 4,395,342, 4,259,373, 4,108,600, 4,107,876, 4,082,678, 4,079,170, 3,868,716, 3,844,286, 3,589,592, and the like. The disclosure of each of these United States patents is hereby incorporated by reference into this specification.

As is disclosed in these patents, the conventional process for making polystyrene foam, which is described in the aforementioned patents, uses the well documented extrusion process for producing cellular polystyrene foam in which a solution of a volatile blowing agent in molten polymer, formed in an extruder under pressure, is forced through an orifice into an ambient environment of temperature and pressure. The polymer simultaneously expands and cools under conditions that give it enough strength to maintain dimensional stability at the time corresponding to optimum expansion. Stabilization is due to cooling of the polymer phase to a temperature below its glass transition or melting point. Cooling is effected by vaporization of the blowing agent, gas expansion, and heat loss to the environment.

The polystyrene foam sheet thus produced is allowed to equilibrate with atmospheric gases for a period of from about 1 to about 5 days, at which time it is heat shaped into a container using conventional thermoforming equipment.

A Preferred Barrier Bag of the Invention

Figure 4:
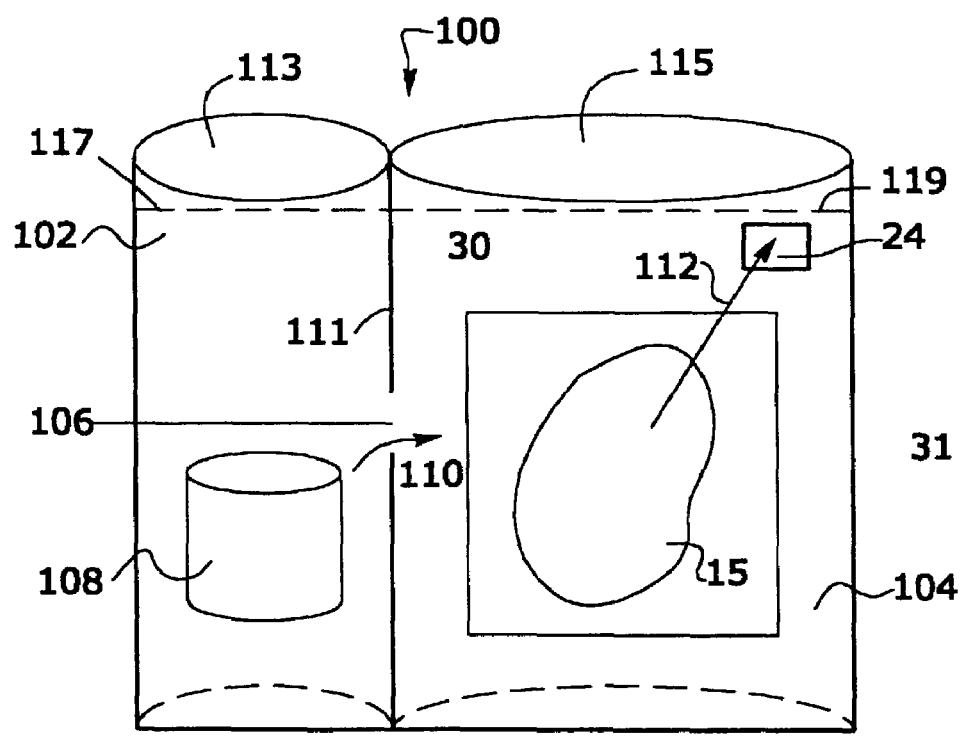
FIG. 4 is a sectional view of one preferred barrier bag which may be used in the packaging system of FIG. 1.

FIG. 4 is a schematic view of another system for preserving perishable goods in which a two-compartment barrier bag comprised of compartment 102 and compartment 104 communicate with each other via an orifice 106.

In the embodiment depicted in FIG. 4, two compartments are depicted, and they are substantially aligned with each other. In another embodiment, not shown, three or more compartments are present in the barrier bag; in one aspect of this embodiment, the third compartment contains a material other than carbon dioxide or perishable goods, such as, e.g., a bacteriostatic agent. In yet another embodiment, the compartments in the barrier bag are not aligned with each other.

In the preferred embodiment depicted in FIG. 4, as will be more clearly described hereinbelow, means are provided for flowing a non-oxidizing gas from one compartment to another compartment. As used herein, the term "non-oxidizing gas" refers to a gas which contains less than about 1 volume percent of oxygen. Thus, such non-oxidizing gases include carbon dioxide, nitrogen, argon, helium, krypton, neon, radon, xenon, and the like. The preferred non-oxidizing gas is selected from the group consisting of carbon dioxide, nitrogen, and mixtures thereof.

Thus, for example, and referring again to FIG. 4, a chunk of solid carbon dioxide 108 is disposed within compartment 102. This solid carbon dioxide gradually sublimes, causing gaseous carbon dioxide to travel via arrows 110 and 112 and, when pressure has built up, to vent through valve 24.

The barrier bag 100 of FIG. 4 is comprised of means for flowing the sublimated carbon dioxide from compartment 102 to compartment 104; in the embodiment depicted, such means include an orifice 106 disposed between compartments 102 and 104. Other means for flowing the gaseous carbon dioxide between compartments 102 and 104 also may be used such as, e.g. a multiplicity of such orifices 106, one or more one-way valves, etc.

The system of this FIG. 4 is very similar to the system depicted in FIG. 1, with the exception that it utilizes a two-compartment barrier bag rather than a single compartment barrier bag, and it does not utilize the tray 30. In the embodiment depicted, the two compartments 102 and 104 are formed by a heat seal 111, which forms a barrier between compartments 102 and 104 except where orifice 106 is present.

In one preferred embodiment, depicted in FIG. 4, an absorbent pad 31 is disposed beneath the goods 15. The absorbent may consist of or be comprised of any material which will absorb fluid from the perishable goods 15. Thus, it may be made out of cotton, absorbent polymeric material, sponge material, open cell foam material, and the like.

In the embodiment depicted in FIG. 4, the barrier bag 100 is open at tops 113 and 115. However, once the solid carbon dioxide 108 and the perishable goods 15 have been disposed within the barrier bag 100, it is preferred to seal tops 113 and 115 to form seals 117 and 119 by the heat sealing means described elsewhere in this specification.

Figure 5:
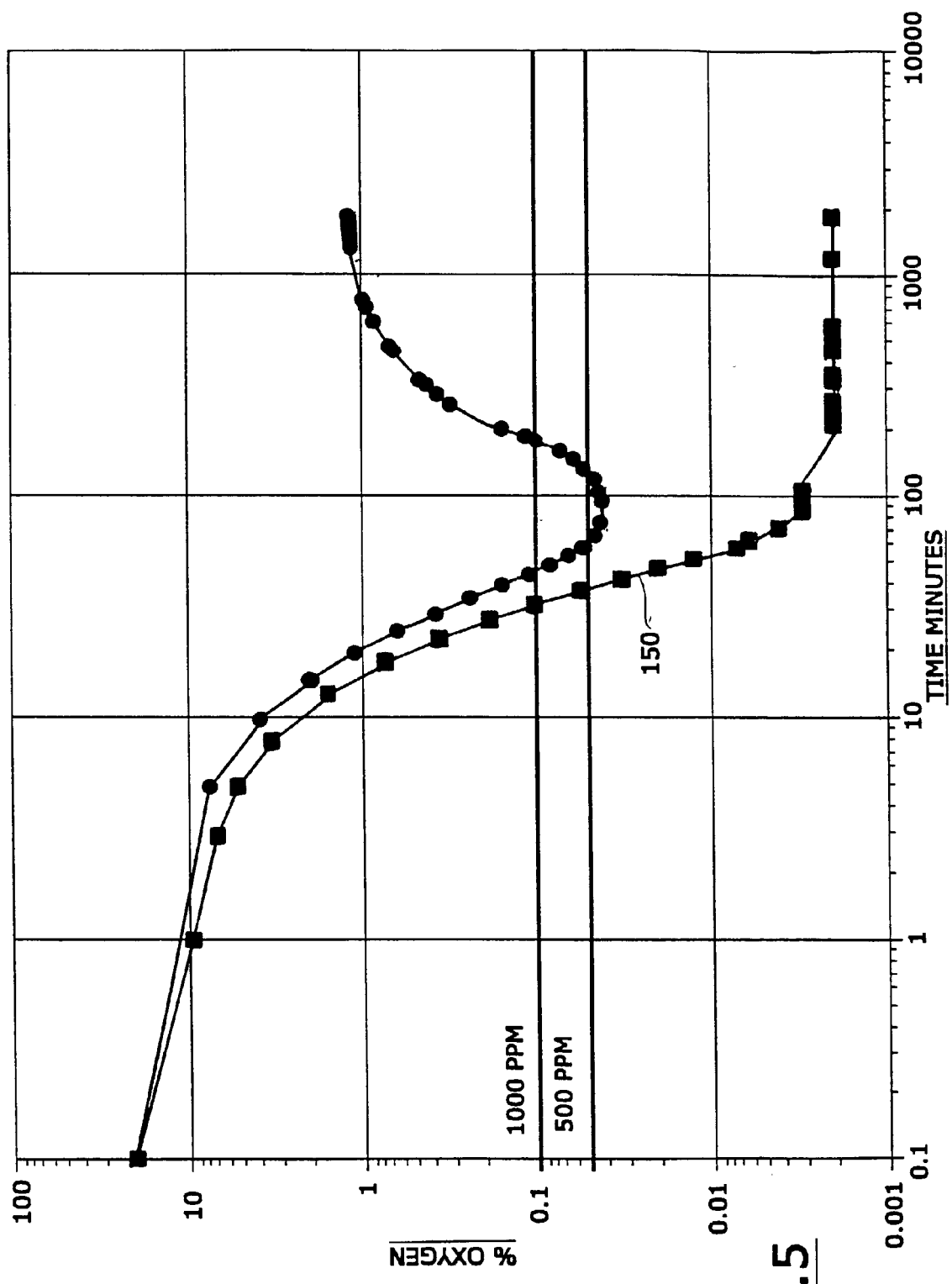
FIG. 5 is a graph illustrating the oxygen concentrations in a specified packaging material over time with two systems, one of which uses a conventional foam tray, and the other of which uses the open-cell foam tray of this invention.

FIG. 5 is a graph presenting data generated from the experiments of the Examples described in applicant's copending patent application Ser. No. 09/342,844.

Another Preferred Packaging System of the Invention

Figure 6:
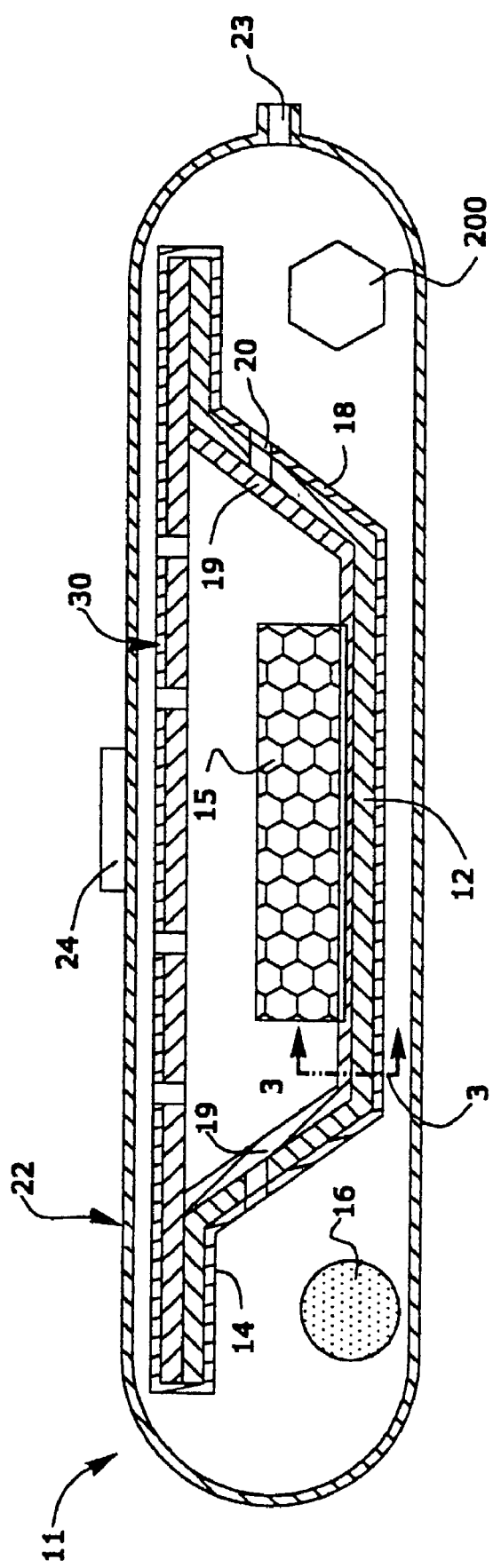
FIG. 6 is a sectional view of another preferred packaging system of the invention.

FIG. 6 shows a packaging system 11 which is substantially identical to the packaging system 10 depicted in FIG. 1 but which differs from packaging system 10 in that it contains oxygen absorber 200. In one embodiment, not shown, a similar oxygen absorber is used in the barrier bag depicted in FIG. 4.

One may use any of the commercially available oxygen absorbers as oxygen absorber 200. One preferred oxygen absorber 200 is an iron-based oxygen absorber such as, e.g., the iron-based absorbent described in U.S. Pat. No. 5,928,960. The entire disclosure of this United States patent is hereby incorporated by reference into this specification.

Further reference may be had to U.S. Pat. No. 5,262,375, which also discusses oxygen absorber packets. The entire disclosure of this patent is hereby incorporated by reference into this specification.

One oxygen absorber packet which may be used in the process of this invention is manufactured by Multiform Dessicants Incorporated of North Tonawanda, N.Y. It is believed that this absorber packet contains iron and silica gel.

Other iron-based oxygen absorbers also will work well as oxygen absorber 200.

Referring again to FIG. 6, and in the preferred embodiment depicted therein, the solid carbon dioxide 16 preferably is in particulate form and has a particle size distribution such that at least about 90 weight percent of its particles are sized in the range from about 25 microns to about 1,000 microns and, more preferably, are sized in the range of from about 100 to about 500 microns. In one embodiment, at least about 90 weight percent of the carbon dioxide particles are in the range of from 200 to about 400 microns.

In the embodiment depicted in FIG. 6, it is preferred that the barrier bag 22 have an oxygen permeability of less than 10 cubic centimeters per 100 square inches per 24 hours, as measured by suitable gas permeability measuring device.

Referring again to FIG. 6, and in the preferred embodiment depicted therein, the tray 12 preferably has a water absorbency of from about 5 to about 500 percent. In the test used to determine water absorbency, a tray is weighed under ambient conditions and then immersed in water for a period of thirty minutes. Thereafter, the tray is removed from the water bath and weighed. The ratio of the weight of the "wet tray" to that of the "dry tray" is at least about 2.0/1.0 and, preferably, at least 2.5/1.0. A tray with the desired characteristics is commercially available form Vitembal S.A. of Remoulins, France, as the "Integral" absorbent tray.

A Process of Limiting the Expansion of the Barrier Bag

Figure 7:
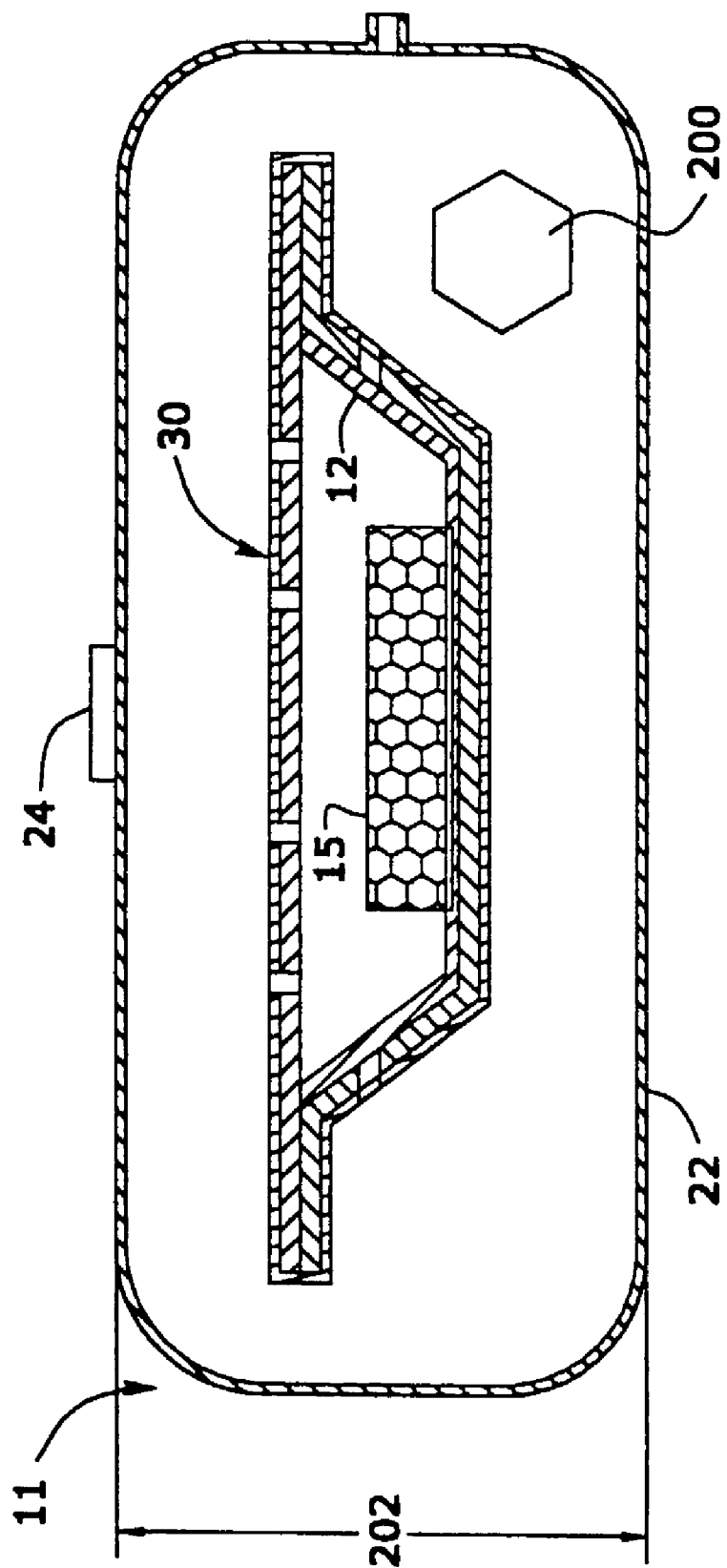
FIG. 7 illustrates a process for making a packaging system in which the barrier bag expands during the process.

FIG. 7 illustrates the condition of packaging system 11 (see FIG. 6) after the carbon dioxide 16 has sublimated and is released through valve 24. Certain components of packaging system 11 have been omitted from FIG. 7 for the sake of simplicity of representation.

Referring to FIG. 7, it will be seen that barrier bag 22 has a height 202, which is substantially greater than the height of the barrier bag 22 depicted in FIG. 6. As will be apparent to those skilled in the art, this occurs because the sublimation of the solid carbon dioxide produces a gaseous phase, which increases the pressure within barrier bag 22. Some of this pressure is vented to atmosphere via valve 24, but some of the pressure causes barrier bag 22 to increase in volume. If the expansion of barrier bag 22 is unrestrained, and depending upon the concentration of the solid carbon dioxide 16, the volume enclosed by barrier bag 22 could increase by as much as 1,500 percent.

When the packaging system 11 has a large volume, it is difficult to ship efficiently and is more cumbersome to use.

Figure 8:
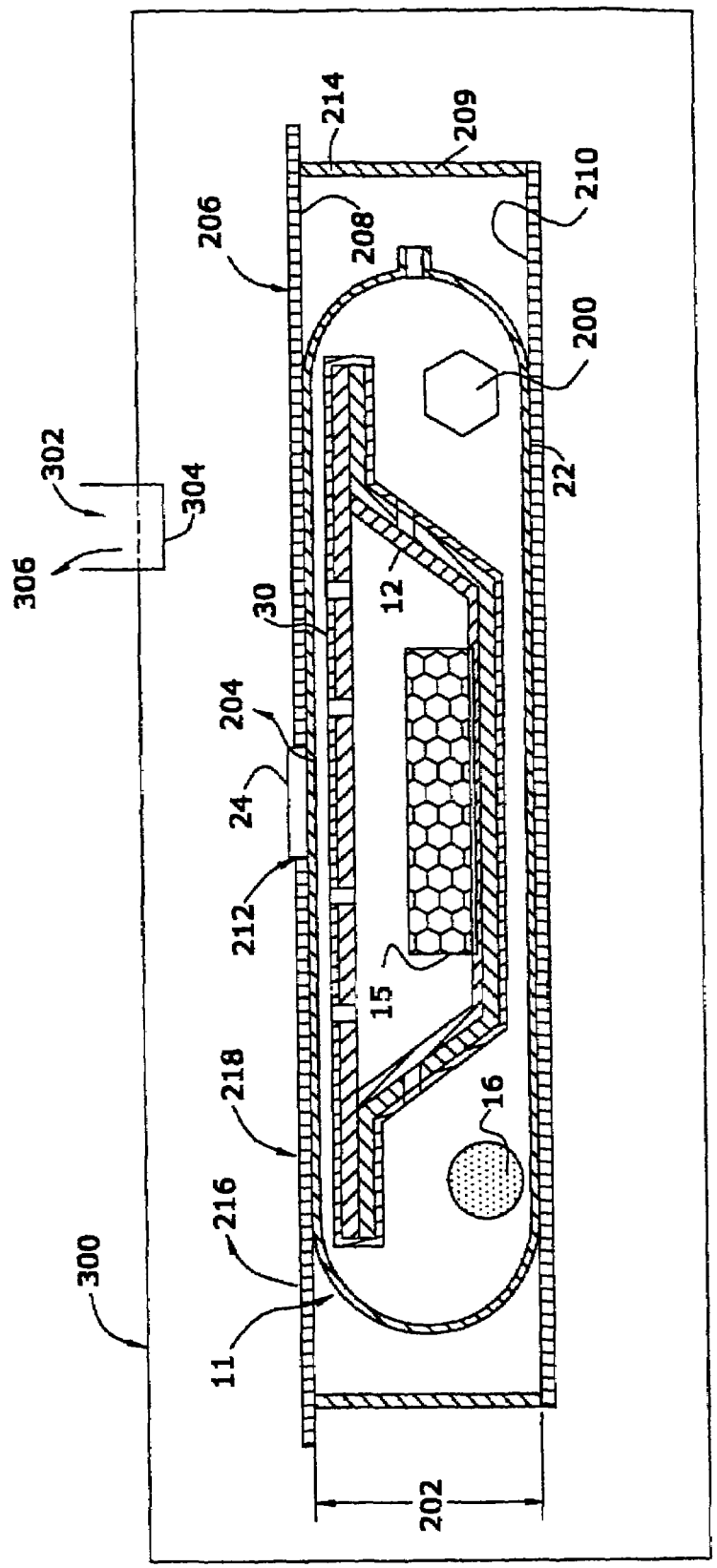
FIG. 8 illustrates a process for limiting the extent to which the barrier bag can expand during the process.

FIG. 8 illustrates a process for limiting the increase in volume of the barrier bag 22. Referring to FIG. 8, it will be seen that the solid carbon dioxide 16 within barrier bag 22 causes sublimate to flow in the direction of arrow 204 through valve 24. It also causes the barrier bag 22 to expand in volume, but such volume expansion is limited by the presence of constraint 206. In the particular embodiment depicted, constraint 206 is comprised of opposing walls 208 and 210, which are separated by distance 202. An orifice 212 disposed within wall 208 is adapted to receive valve 24 and to allow gas passing through valve 24 to exit the constraint 206. Depending upon the extent of distance 202, the extent to which the barrier bag 22 will be allowed to expand during sublimation of the solid carbon dioxide 16 can be controlled.

One may use any suitable means for controlling the expansion of the volume within barrier bag 22. In one embodiment, not shown, wall 208 is hingeably attached at point 214 to wall 209 and may be rotated upwardly in the direction of arrow 216 and/or downwardly in the direction of arrow 218, thereby varying the effective distance 202 between wall 208 and wall 210 at various points along such wall. Other suitable means for controlling the expansion of the volume within barrier bag 22 will be apparent to those skilled in the art.

In one embodiment, the restraining means is comprised of shrink film, which is used as the barrier bag 22 (see, e.g., FIG. 1). This shrink film barrier bag 22 is preferably oxygen-impermeable. Some suitable oxygen-impermeable shrink films are described, e.g., in U.S. Pat. Nos. 5,645,788, 5,482,770, 5,376,394, 5,302,402, 5,035,8512, 4,894,107, and the like. The disclosure of each of these United States patents is hereby incorporated by reference into this specification.

As will be apparent, once the shrink film barrier bags 22 are heat treated, they resist deformation by gas pressure, thereby effectively reducing the volume of the system and restraining expansion of the package.

Referring again to FIG. 8, and in the preferred embodiment depicted therein, the packaging device 11 constrained by constraint 206 is disposed within a vacuum chamber 300 comprised of a port 302. Sublimate exiting constraint 206 through valve 24 then can exit vacuum chamber 300 through valve 304 in the direction of arrow 306.

As will be apparent to those skilled in the art, the presence of a vacuum within vacuum chamber 300 facilitates the removal of oxygen from barrier bag 22. It is preferred that the vacuum within vacuum chamber 300 be less than 10.0 millimeters of mercury absolute. This will cause the pressure within barrier bag to be less than about 10.0 millimeters of mercury absolute.

A Preferred Process of this Invention

Figure 9B:
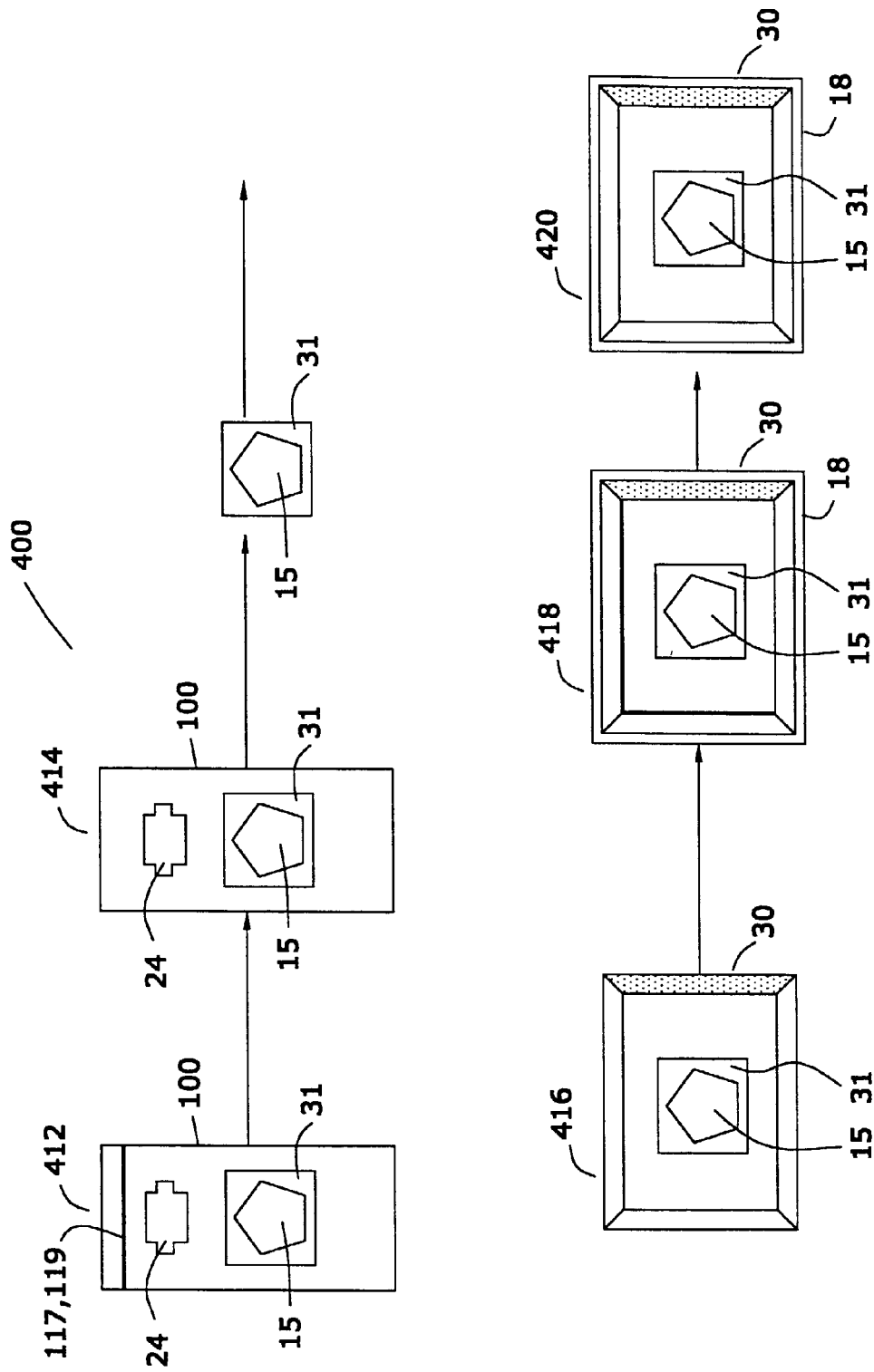

FIGS. 9A and 9B are schematic representations of a preferred process of this invention which utilizes the barrier bag 100 of FIG. 4. In these Figures, unnecessary detail has been omitted for the sake of simplicity of representation.

In step 402, an absorbent pad 31 is disposed within one of the two compartments (not shown) of the barrier bag 400. Thereafter, in step 404, perishable goods 15 (such as, e.g., red meat) are disposed on top of the absorbent pad 31. Thereafter, the package may then be weighed and labeled.

In step 406, a source of non-oxidizing gas, such as particulate carbon dioxide 108, may be added to the other of the two compartments (not shown) of the barrier bag 100. Thereafter, in step 408, the barrier bag 100 is evacuated and sealed to form seals 117/119. After sealing, the sealed bag is then shipped in step 410.

Referring to FIG. 9B, the shipped bag is received in step 412. It should be noted that, during shipping, the solid carbon dioxide 108 has sublimated and in no longer present in such particulate form within the barrier bag 100.

In step 414, the sealed barrier bag 100 is opened, and the absorbent pad 31/perishable goods 15 are removed from the bag. In step 416, the absorbent pad 31 and/or the perishable goods 15 are placed within a tray 30, which is overwrapped with film 18 in step 418 to form the final wrapped product 420. The product 420 may be weighed and labeled.

Figure 10:
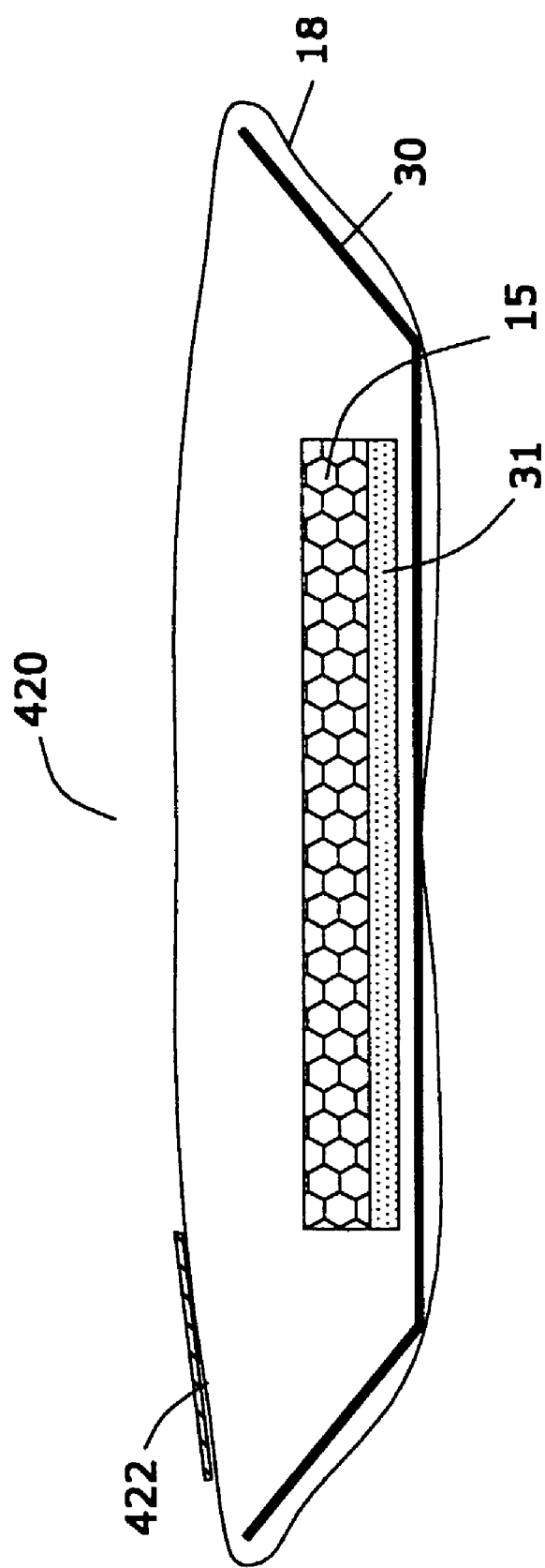
FIG. 10 is a side view of the final product produced by the process of FIGS. 9A and 9B.

FIG. 10 is a side view of final product 420 on which has been affixed a label 422.

A Preferred Packaging System for Moisture-Containing Perishable Foods

Figure 11:
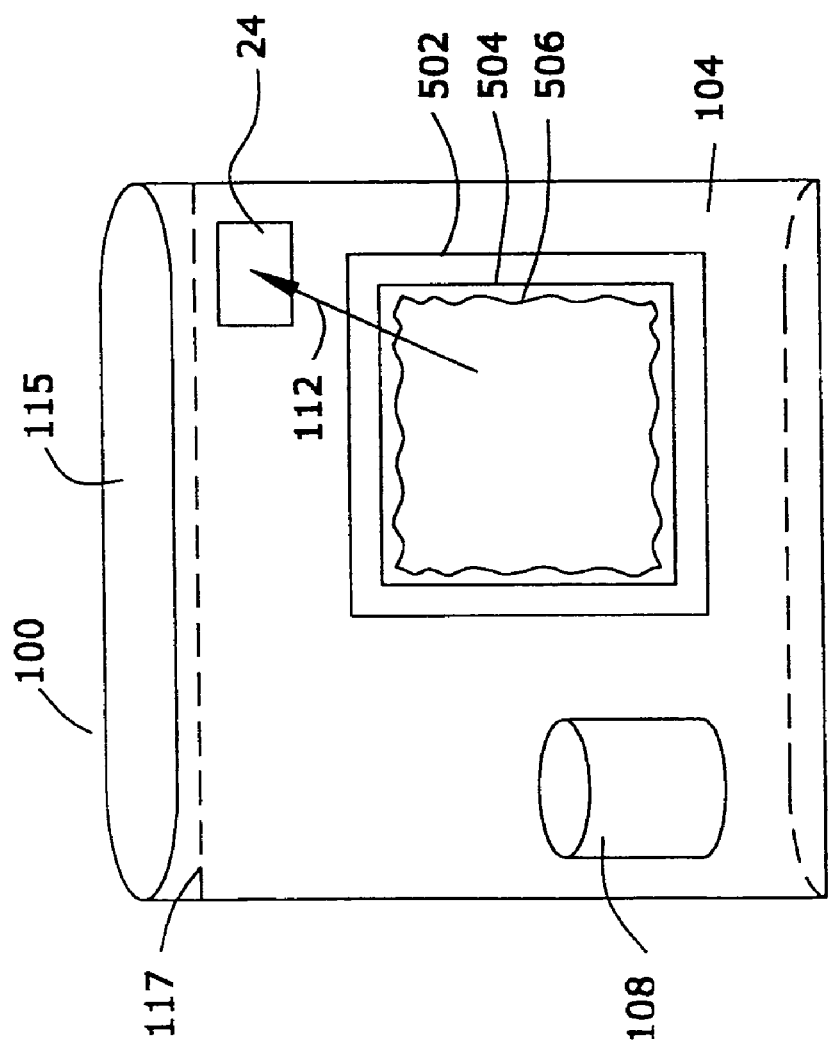
FIG. 11 is a sectional view of one preferred barrier packaging system for extending the shelf life of moisture-containing foods.

FIG. 11 is a schematic view of a system for preserving perishable moisture containing foods. Referring to FIG. 11, packaging system 500 comprises barrier bag 100, water-containing pad 502, and container 504. In the preferred embodiment depicted in FIG. 11, barrier bag 100 is similar in structure to the barrier bag 100 of FIG. 4 described previously, with the exception being that barrier bag 100 comprises a single compartment. In an alternate embodiment (not shown), the barrier bag comprises a pair of compartments as depicted in FIG. 4.

The packaging of a perishable moisture-containing food proceeds in a manner similar to that for packaging of meat, which was described previously in this specification. The exception, however, is that a component of the packaging system is used to provide water vapor within the packaging, rather than wick liquid juices away from the food. Referring again to FIG. 11, water-containing pad 502 is inserted into the barrier bag 100, followed by container 504, within which is contained perishable moisture-containing food 506.

Barrier bag 100 is then provided with a chunk of solid carbon dioxide 108 disposed therein, and seal 117 is formed in bag 100, as described previously and shown in FIG. 4. This solid carbon dioxide chunk 108 gradually sublimes, causing gaseous carbon dioxide to travel via arrow 112 and, when pressure has built up, to vent through valve 24. The sublimation of the carbon dioxide purges substantially all of the oxygen and water vapor from the atmosphere within barrier bag 100.

Figure 12:
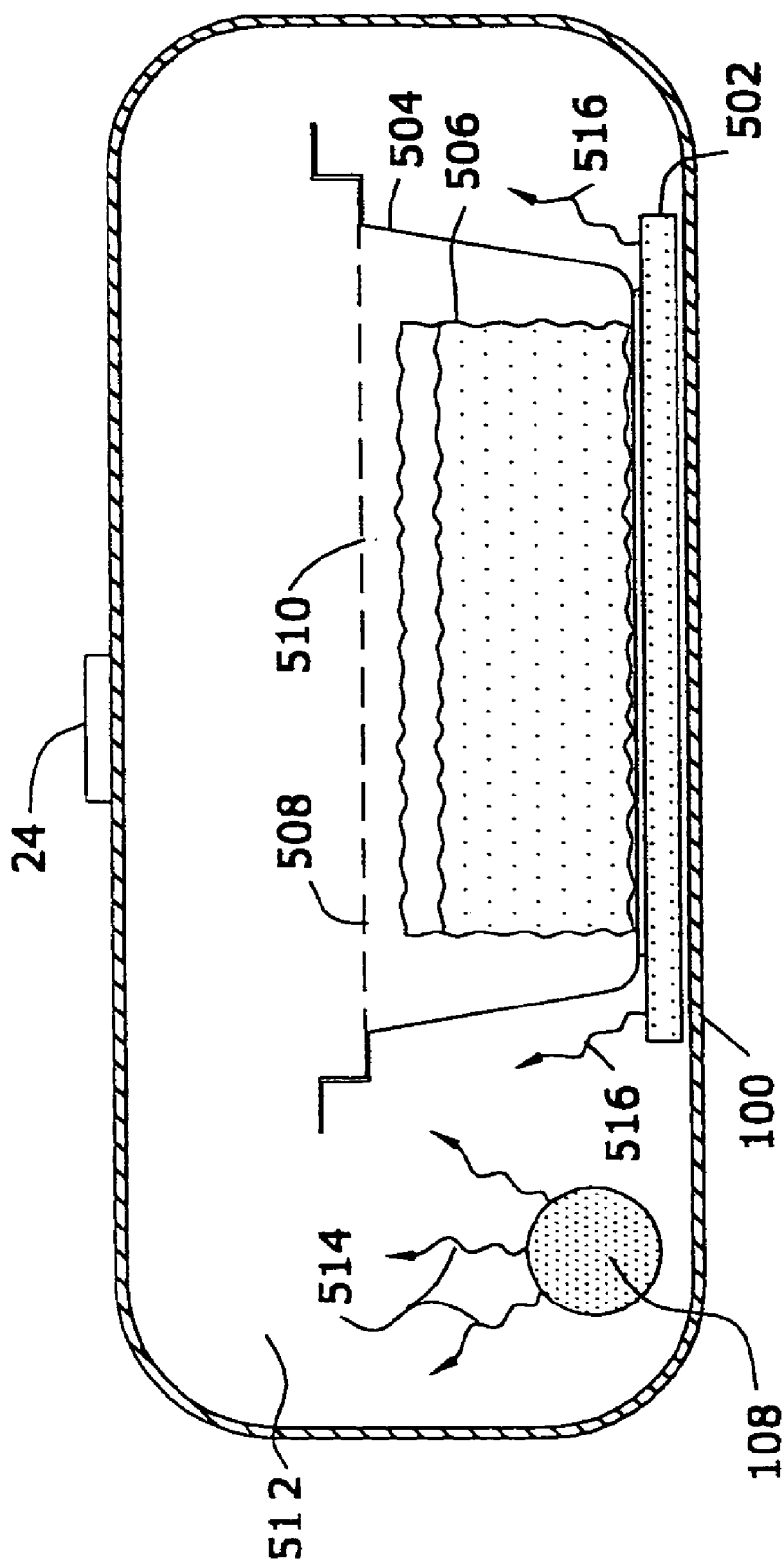
FIG. 12 is a detailed sectional view of a moisture-containing food enclosed within a barrier package, during an intermediate step in the packaging process.

FIG. 12 is a detailed sectional view of a moisture-containing food enclosed within barrier package 100 of FIG. 11. In one embodiment (not shown), container 504 is an open tray, and oxygen and water vapor are freely removed therefrom. In the embodiment depicted in FIG. 12, container 504 comprises a lid 508, and container 504 is preferably a clear transparent oxygen permeable material, such as oriented polystyrene (OPS), clear amorphous poly(ethylene terephthalate) (APET), polypropylene, polyvinyl chloride, high density polyethylene, low density polyethylene, poly methyl pentene, and other like materials, which are sufficiently oxygen permeable and are able to be formed into clear, transparent containers. Such packaging materials are further described in U.S. Pat. Nos. 5,584,408 and 6,253,820, the disclosures of which are hereby incorporated by reference.

In one embodiment, it is preferred that the density of the material of container 504 is between about 0.85 grams/cubic centimeter and about 1.04 grams/cubic centimeter. In another embodiment, it is preferred that the oxygen permeability of the material of container 504 is between about 5.0 cubic centimeters-mil/100 square inches/day/atmosphere and about 4000 cubic centimeters-mil/100 square inches/day/atmosphere at 75 degrees Fahrenheit. (In the above permeability units, one mil is defined as one thousandth of an inch of container wall thickness; and 100 square inches refers to a unit of surface area of the container wall.)

Thus when using such preferred materials for container 504, when the oxygen concentration of the atmosphere inside of the barrier bag 100, but outside of container 504 is purged to a value near zero, oxygen diffuses through the walls of container 504 until the oxygen concentration within container 504 is also lowered to a value near zero. It is noted that the preference that container 504 be made of a clear transparent material renders the food contained therein visible to a customer who is contemplating a purchase.

It is further noted that the lid of a typical commercially available container such as one made of OPS is generally not air tight, and affords some gas flow around the perimeter thereof. In a further embodiment depicted in FIG. 12, lid 508 of container 504 is provided with perforations 510, which enable more rapid escape of oxygen and water vapor therefrom by diffusion and convection, if such rapid escape is necessary. In yet a further embodiment (not shown), barrier bag 100 containing water-containing pad 502, container 504, and perishable moisture-containing food 506 are placed within a vacuum chamber 300 of FIG. 8, and the atmosphere therein is evacuated, thereby reducing the oxygen concentration. The evacuated air is subsequently replaced with sublimed carbon dioxide. In each of these embodiments, the atmosphere 512 within barrier bag 100 of FIG. 12 is rendered substantially free of oxygen and water vapor when the sublimation of carbon dioxide gas indicated by arrows 514 from solid carbon dioxide 108 is complete and solid carbon dioxide is fully depleted.

At this point, however, only a small amount of water vapor has evaporated from water-containing pad 502, and a substantial reserve of liquid water remains therein to be evaporated into the atmosphere 512 within barrier bag 100. In one preferred embodiment, water-containing pad 502 is made of a wafer of hydrophilic open cell foam, such that it is wettable, and absorbs water. In one more preferred embodiment, such open cell foam wafer is made from a resin selected from the group consisting of polyethylene, polyvinyl chloride, polyacrylonitrile (such as the "BAREX" resin sold by the British Petrolem/Amoco company), poly(ethylene terephthalate), polystyrene, rubber-modified polystyrene, ethylenepolystyrene, interpolymers (such as "INDEX" interpolymers sold by Dow Chemical Corporation of Midland Michigan), polypropylene, polyurethane, polyisocyanurate, epoxy, urea formadehyde, rubber latex, silicone, fluropolymer or copolymers thereof or blends thereof.

In another embodiment, water containing pad 502 is made of a water absorbing and/or water retentive fabric piece. Such fabric piece may be unitary, comprising hydrophilic fibers having a woven, knitted, felt, gauze, or other construction having a substantial void volume. Suitable hydrophilic fibers comprising water containing pad 502 may include, but are not limited to, e.g cellulose fibers. Additionally or alternatively, water containing pad 502 may have incorporated therein superabsorbent polymers such as are described in U.S. Pat. No. 6,458,877, the disclosure of which is incorporated herein by reference.

In one embodiment, water containing pad 502 is made of a flexible laminated structure having a cellulose fabric pad sandwiched between thin outer layers of polyethylene film, wherein one of the thin outer layers further comprises an array of small perforations therethrough. Such water containing pad is manufactured and sold as an "Ultra Zap Soaker" pad by Paper-Pak Products, Inc., of San Dimas, Calif., and further comprises a bacteriostatic agent suppresses destructive bacterial growth in pads used in food packaging.

The operative requirements for water containing pad 502 are that it is wettable and thus capable of absorbing water; that the pore structure of pad 502 is such that the mass transfer of liquid and gaseous water therethrough, and subsequent discharge as vapor 516 is slow compared to the depletion of the solid carbon dioxide 508; and that the size of pad 502 provides sufficient volume of pores to contain enough water to rehumidify the atmosphere 512 of barrier bag 100 after sublimation of solid carbon dioxide is complete. Depending upon the size of the barrier bag 100, the size and properties of pad 502, and the amount of water added to pad 502 prior to packaging, the level of relative humidity of the atmosphere on the final packaged product may be chosen in the range of 0.2 to 100 percent saturation.

In a further embodiment (not shown), water containing pad comprises an inorganic salt. Such inorganic salt may be disposed in a permeable packet, along with and separate from an absorbent pad, to establish and maintain a constant relative humidity in the closed package space. Such an inorganic salt equilibrates with the surrounding atmosphere within the barrier bag at a relative humidity that is less than saturation. Suitable inorganic salts include, but are not limited to, anhydrous copper sulfate, calcium chloride, and zinc chloride. Similar inorganic salt materials are described in the Handbook of Chemistry and Physics 47th Edition, published by The Chemical Rubber Company.

A Preferred Process for Packaging Moisture-Containing Perishable Foods

Figure 13:
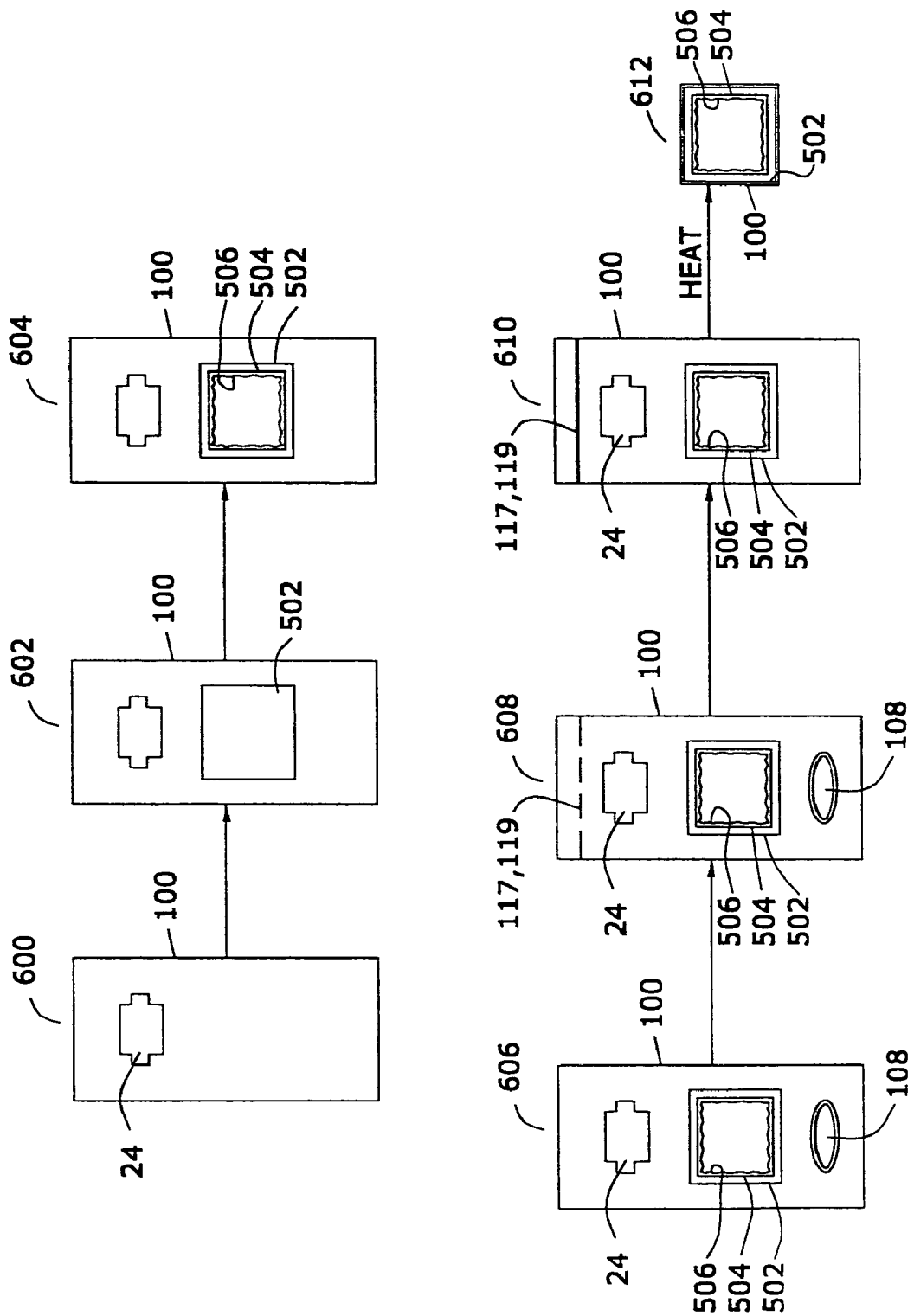
FIG. 13 is a schematic representation of one preferred process for the packaging of a moisture-containing food.

FIG. 13 is a schematic representation of one preferred process for the packaging of a perishable moisture-containing food. In these Figures, unnecessary detail has been omitted for the sake of simplicity of representation.

In step 600, in an operation not shown, a pad is wetted with water to a desired water content up to saturation.

In step 602, water-containing pad 502 is disposed within barrier bag 100. Thereafter, in step 604, container 504 containing perishable moisture-containing food 506 (such as, e.g., a cake) is disposed within barrier bag 100. Thereafter, the package may then be weighed and labeled.

In step 606, a source of non-oxidizing gas, such as particulate carbon dioxide 108, may be added to the barrier bag 100. Thereafter, in step 608, the barrier bag 100 is evacuated and sealed to form seals 117/119. After sealing, the sealed bag, the solid carbon dioxide continues to sublime until is fully depleted in step 610.

Figure 14:
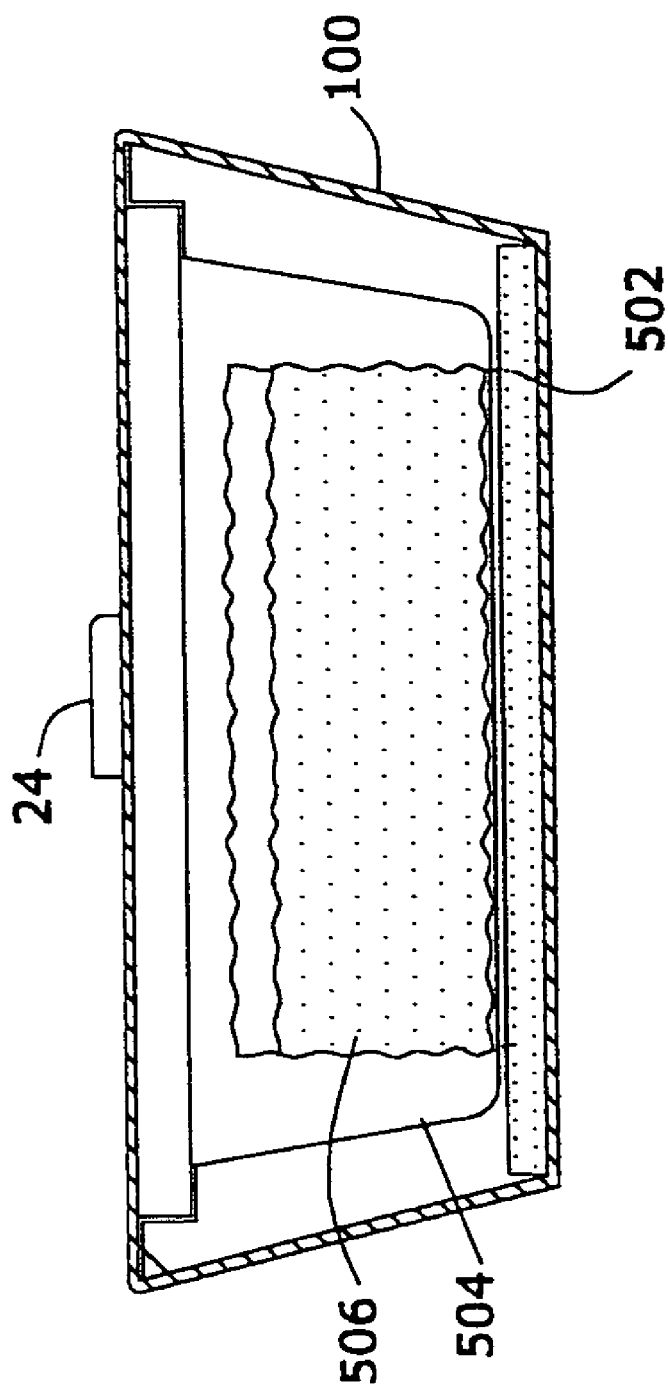
FIG. 14 is a sectional view of the final product produced by the process of FIG. 13.

In one preferred embodiment, barrier bag 100 is comprised of a heat shrink material previously described in this specification. Accordingly, in step 612, barrier bag 100 is heated and shrunk to substantially conform to the shape of container 504, as shown in FIG. 14. The atmosphere 512 of barrier bag is maintained in a moist state by water-containing pad 502. Thus perishable moisture-containing food 506 within container 504 is also maintained in a moist state.

It is to be understood that the system and method of the present invention are suitable for the packaging and preservation of any product that requires packaging in a humid, non-oxidizing environment. It is to be further understood that the system and method of the present invention may be modified to provide a self-humidifying package without a non-oxidizing environment, simply by eliminating the use of solid carbon dioxide. Such packaging would be useful in the preservation of products that require a moist environment, but are not degraded by oxygen.

It is to be understood that the aforementioned description is illustrative only and that changes can be made in the apparatus, in the ingredients and their proportions, and in the sequence of combinations and process steps, as well as in other aspects of the invention discussed herein, without departing from the scope of the invention as defined in the following claims.

I claim:

1. A packaging system for preserving perishable moisture-containing items comprising a barrier bag having at least one compartment, sealing means for closing said barrier bag, a non-oxidizing gas disposed within said barrier bag, a water-containing pad disposed within said barrier bag, and means for venting gases and water vapor from said barrier bag.

2. The packaging system as recited in claim 1 further comprising a container disposed within said barrier bag.

3. The packaging system as recited in claim 2, wherein said container is comprised of a clear transparent material.

4. The packaging system as recited in claim 2, wherein said container is comprised of an oxygen permeable material.

5. The packaging system as recited in claim 4, wherein said oxygen permeable material is oriented polystyrene.

6. The packaging system as recited in claim 4, wherein said oxygen permeable material is poly(ethylene terephthalate).

7. The packaging system as recited in claim 2, wherein said non-oxidizing gas is selected from the group consisting of carbon dioxide, nitrogen, and mixtures thereof.

8. The packaging system as recited in claim 7, wherein said non-oxidizing gas is carbon dioxide.

9. The packaging system as recited in claim 8, wherein said carbon dioxide further comprises solid carbon dioxide disposed within said barrier bag.

10. The packaging system as recited in claim 7, wherein said non-oxidizing gas is nitrogen.

11. The packaging system as recited in claim 7, wherein said non-oxidizing gas is a mixture of carbon dioxide and nitrogen.

12. The packaging system as recited in claim 1, wherein said means for venting gases and water vapor from said barrier bag is a pressure relief valve.

13. The packaging system as recited in claim 1, wherein said sealing means for closing said barrier bag is a heat seal.

14. The packaging system as recited in claim 1, wherein said barrier bag is a heat shrinkable barrier bag.

15. The packaging system as recited in claim 1, wherein said water containing pad comprises a wafer of open cell foam.

16. The packaging system as recited in claim 15, wherein said open cell foam is made from a resin selected from the group consisting of polyethylene, polyvinyl chloride, polyacrylonitrile, poly(ethylene terephthalate), polystyrene, rubber-modified polystyrene, ethylenepolystyrene, interpolymers, polypropylene, polyurethane, polyisocyanurate, epoxy, urea formadehyde, rubber latex, silicone, fluropolymer or copolymers thereof or blends thereof.

17. The packaging system as recited in claim 1, wherein said water containing pad comprises a layer of hydrophilic fabric.

18. The packaging system as recited in claim 1, wherein said water containing pad comprises a superabsorbent polymer.

19. The packaging system as recited in claim 1, wherein said water containing pad comprises an inorganic salt.

20. The packaging system as recited in claim 19, wherein wherein said inorganic salt is selected from the group consisting of anhydrous copper sulfate, calcium chloride, and zinc chloride, and mixtures thereof.

21. A packaging system for preserving perishable moisture-containing items comprising
a shrinkable barrier bag comprising at least one compartment, and a one-way valve disposed in the wall thereof;
sealing means for closing said barrier bag;
a carbon dioxide gas source gas disposed within said barrier bag;
a clear transparent oxygen-permeable container disposed within said barrier bag, for containment of perishable moisture containing items; and
a water-containing pad disposed within said barrier bag for providing humidity within said barrier bag.

22. The packaging system as recited in claim 21, wherein said carbon dioxide comprises solid carbon dioxide disposed within said barrier bag.

23. The packaging system as recited in claim 21, wherein said sealing means for closing said barrier bag is a heat seal.

24. The packaging system as recited in claim 21, wherein said water containing pad comprises a wafer of open cell foam.

25. The packaging system as recited in claim 21, wherein said water containing pad comprises a layer of hydrophilic fabric.

26. The packaging system as recited in claim 21, wherein said water containing pad comprises a superabsorbent polymer.

27. The packaging system as recited in claim 21, wherein said water containing pad comprises an inorganic salt.

* * * * *